United States Patent [19]
Silenius

[11] Patent Number: 6,156,118
[45] Date of Patent: Dec. 5, 2000

[54] FILLER FOR USE IN PAPER MANUFACTURE AND METHOD FOR PRODUCING IT

[75] Inventor: Petri Silenius, Kirkniemi, Finland

[73] Assignee: Metsa-Serla Corporation, Espoo, Finland

[21] Appl. No.: 09/193,509

[22] Filed: Nov. 17, 1998

[30] Foreign Application Priority Data

Nov. 21, 1997 [FI] Finland ..................................... 974297

[51] Int. Cl.$^7$ .............................. C08L 1/02; C09D 17/00
[52] U.S. Cl. .................................. 106/501.1; 106/204.01; 106/204.2; 106/204.3; 106/447; 106/465; 106/468; 106/469; 106/471
[58] Field of Search ........................... 106/204.01, 204.2, 106/204.3, 447, 465, 468, 469, 471, 501.1

[56] References Cited

U.S. PATENT DOCUMENTS

| | | |
|---|---|---|
| 1,443,454 | 1/1923 | Booth . |
| 3,262,877 | 7/1966 | Le Compte, Jr. . |
| 3,873,418 | 3/1975 | Brax . |
| 4,889,594 | 12/1989 | Gavelin . |
| 4,895,019 | 1/1990 | Lehmikangas et al. . |
| 5,127,994 | 7/1992 | Johansson . |
| 5,558,782 | 9/1996 | Bleakley et al. . |
| 5,601,921 | 2/1997 | Eriksson . |
| 5,731,080 | 3/1998 | Cousin et al. . |
| 5,733,461 | 3/1998 | Bleakley et al. . |
| 5,824,364 | 10/1998 | Cousin et al. . |

FOREIGN PATENT DOCUMENTS

| | | |
|---|---|---|
| 0 209 538 | 5/1990 | European Pat. Off. . |
| 0 604 095 | 6/1994 | European Pat. Off. . |
| 0 703 451 | 3/1996 | European Pat. Off. . |
| 931584 | 10/1993 | Finland . |
| 944355 | 10/1994 | Finland . |
| 100729 | 12/1996 | Finland . |
| 2 265 916 | 10/1993 | United Kingdom . |
| WO 93/20010 | 10/1993 | WIPO . |
| WO 97/01670 | 1/1997 | WIPO . |

OTHER PUBLICATIONS

1999–387701, Silenius, "Filler for use in paper manufacture . . . ", May 21, 1999.
1999–421639, Silenius, "Manufacturing paper products . . . ", Aug. 10, 1999.
1997–100236, Leskela et al, "Filler for paper . . . ", Jan. 16, 1997.
Jun. 1983, Tom Lindström et al. "Effects of pH and electrolyte concentration on the adsorption of cationic polyacrylamides on cellulose" *Tappi Journal*, vol. 66, No. 6, pp. 83–85. No date provided.
1996, E. Gruber et al. "Wechselwirkungen von synthetischen kationischen Polymeren mit Fasern und Füllstoffen" *Wochenblatt für Papierfabrikation*, pp. 4–11. No date provided.
1991, H. Eltsner et al. "Anderung der Faserstruktur beim Receylcing . . . " *Wochenblatt für Papierfabrikation*, pp. 5–7. (copy of article to follow; see IDS for relevance) no date provided.
1983, N.–E. Virkola: Puumassan Valmistus, Turku (1983,) p 685 no month provided.
INSKO presentation 150–90 IV; Jan. Erik Levlin, MA: Uusiomassan Paperitekniset Ominasisuudet, p. 4 no date provided.

*Primary Examiner*—David Brunsman
*Attorney, Agent, or Firm*—Altera Law Group, LLC

[57] ABSTRACT

The invention relates to a filler for use in paper manufacture, said filler containing pigment and noil produced from cellulose fibre and/or mechanical pulp fibre by refining. According to the invention, the pigment has been mixed with noil fibrils, to be used as filler in paper manufacture.

The invention also relates to a method for producing a filler for use in paper manufacture, said filler containing pigment and noil produced from cellulose fibre and/or mechanical pulp fibre by refining. According to the invention, the pigment is mixed with noil fibrils, to be used as filler in paper manufacture.

19 Claims, 9 Drawing Sheets

FILLER FOR USE IN PAPER MANUFACTURE AND METHOD FOR PRODUCING IT

The present invention relates to a filler for use in paper manufacture, as defined in the preamble of claim 1. Moreover, the invention relates to a method for producing said filler.

In this application, 'paper' refers to different kinds of paper and cardboard, coated or uncoated, manufactured on a paper and cardboard machine.

Today, the trend of development of paper products is increasingly determined by customers and legislative measures. The buyers of printing paper want to economise on postage and reduce the amount of waste produced. Further, waste processing charges depending on weight have been imposed on packaging materials. Generally, it seems that energy taxes and environmental protection taxes are being added as an extra imposition to the price of paper products. For these reasons, paper buyers want paper products of a lower grammage which still meet high quality requirements.

Because of the general trend of development described above, there is a need to produce high-quality paper using a reduced amount of raw material. When the grammage of paper is reduced, its opacity becomes a critical property. Opacity can be increased by increasing the filler content of the paper, but this generally reduces its strength properties. Therefore, there is a need to alter the paper structure in a way that allows the important good product properties to be maintained at the same time. For paper-based communication to remain competitive with respect to electric communication, further improvements in the impression quality of paper products are required.—These general trends of development impose very high requirements on the raw materials of paper and on paper production processes. In order to meet the requirements, intensive efforts have been made in recent times to further develop paper raw materials and their production processes.

In prior art, specification 944355 describes a filler consisting of calcium carbonate precipitated on seed material; the seed material consists of scalenohedral calcium carbonate particles. Further, according to the specification referred to, 25% of the filler particles are of a prismatic shape.

From specification EP 604095, a method for the treatment of fine waste material in paper industry waste water. The waste material consists of short cellulose fibres and fibre pieces, inorganic material and similar fine material. By this method, the waste material can be more easily separated and dried.

Specification FI 931584 presents a composite product and a method for its manufacture, based on precipitation of calcium carbonate on the surface of cellulose fibres. The fibres are mainly whole chemical pulp fibres, individual microfibrils are only present on fibre surfaces.

From specification FI 931584, a filler is known that consists of porous aggregates formed by calcium carbonate particles precipitated on noil fibrils produced by refining from cellulose fibres and/or mechanical pulp fibres; as to their size distribution, the noil fibrils correspond to wire screen fraction P100. The noil gives the paper better optical and strength properties and a lower grammage than earlier calcium carbonate based fillers. For the manufacture of this product, calcium carbonate must be precipitated on the surface of noil fibrils.

The object of the present invention is to disclose a new type of filler that meets the requirements specified above and that is easier to manufacture than corresponding fillers known before.

A specific object of the invention is to disclose a new type of filler that has better optical properties than commonly known prior-art fillers and that is easier to manufacture than previously known fillers that meet corresponding criteria. A further object of the invention is to disclose a new type of filler that gives the paper better strength properties, especially a better tensile strength, and a lower grammage than fillers commonly known in prior art and that is still easier and cheaper to manufacture than prior-art fillers of corresponding type. An additional object of the invention is to disclose a filler whose production requires no further investments and which can generally be produced using existing equipment.

Another object of the invention is to disclose a method for producing said filler.

As for the features characteristic of the invention, reference is made to the claims.

The invention is based on the unexpected observation, made during investigations, that a filler having the desired optical, strength and grammage properties can be advantageously produced by mixing a pigment directly with noil produced by refining from pulp fibre, preferably chemical pulp fibre, to form a special filler mixture that can be used as a filler in paper manufacture, achieving the above-mentioned desired paper properties.

The filler and method of the present invention differ from the filler and method presented in specification FI 953238 in that, according to the present application, the pigment is mixed with noil fibrils to form a special filler mixture, which is then mixed with paper pulp or used in coating like a conventional filler, whereas in specification FI 953238 the pigment, i.e. calcium carbonate, is precipitated onto noil fibrils. A new feature in the filler described in the present application is that the pigment mixed with the noil forms a filler that allows the desired optical paper properties, strength properties and low grammage to be achieved. Before, corresponding paper properties have only been achieved by precipitating a filler onto noil fibrils (FI 953238). Now, according to the present invention, the same advantageous results can be achieved via a mere mixing process by mixing pigment and noil together, whereupon the filler thus obtained is mixed with the pulp, e.g. in a machine tank or some other suitable mixer or container.

According to a preferred embodiment of the invention, the noil consists of noil fibrils, which mainly correspond in size distribution to wire screen fraction P50, preferably fraction P100. Even finer fractions, e.g. P200 and P400, may be used.

In another preferred embodiment of the invention, the mass ratio of pigment to noil is 0.1–20, preferably 0.2–10, most preferably 2–6. In this description, all mass ratio values have been calculated for dry matter.

The pigment may consist of kaolin, talcum, titan dioxide, ground calcium carbonate, precipitated calcium carbonate (PCC), chalk, synthetic silicate (such as aluminium silicate, aluminium magnesium silicate), barium sulphate, aluminium hydroxide or in general any known pigment. Different calcium carbonates and kaolin are especially well suited for this purpose. Particularly good results have been achieved using precipitated and ground calcium carbonates, e.g. calcium carbonates having a scalenohedral crystal structure.

In an embodiment of the invention, the consistency of the filler is of the order of 0.4–10 w-%.

The pigment used in the method of the invention is mixed with noil fibrils, e.g. using any known mixing apparatus, and the mixture can be used in the conventional manner in paper manufacture.

The noil can be advantageously produced from cellulose fibre and/or pulp fibre by refining so that the edge load is of the order of 0.01–8 Ws/m.

In a preferred embodiment, the refining can be effected using any known type of refiner, e.g. a conical refiner or a disk refiner.

The specific energy consumption in the refining process is of the order of 10–1000 kWh/t, preferably 100–700 kWh/t, most preferably 100–300 kWh/t.

In the mixing of pigment and noil, their mass ratio is preferably 0.1–20, more preferably 0.2–10, most preferably 2–6.

The filler of the invention can be used as filler directly as such or in any mixture ratio (0–100%) with another known filler or other known fillers. The amount of filler to be used in paper is e.g. 0.1–50 w-%, preferably 0.1–30 w-%.

The filler of the invention and the method of the invention for producing it will be described in detail in the following embodiment examples referring to the attached drawings, wherein

EXAMPLE 1

Production of Filler

Bleached pine sulphate pulp was refined in a Valley laboratory hollander in accordance with standard SCAN-C 25:76 for 2.5 hours. The refined pulps were screened with a Bauer-McNett screen, initially using the wire sequence 14–50–100–200 mesh. The amount of dry matter screened at a time was 45 g. The fraction passed through the 100 mesh wire (fraction P100) was saved and allowed to settle for 2 days, whereupon the aqueous phase on the surface was separated.

The P100 fraction was thickened by centrifuging to a consistency of 4.7 g/l, whereupon the noil was ready for use in filler production.

Figure 1:
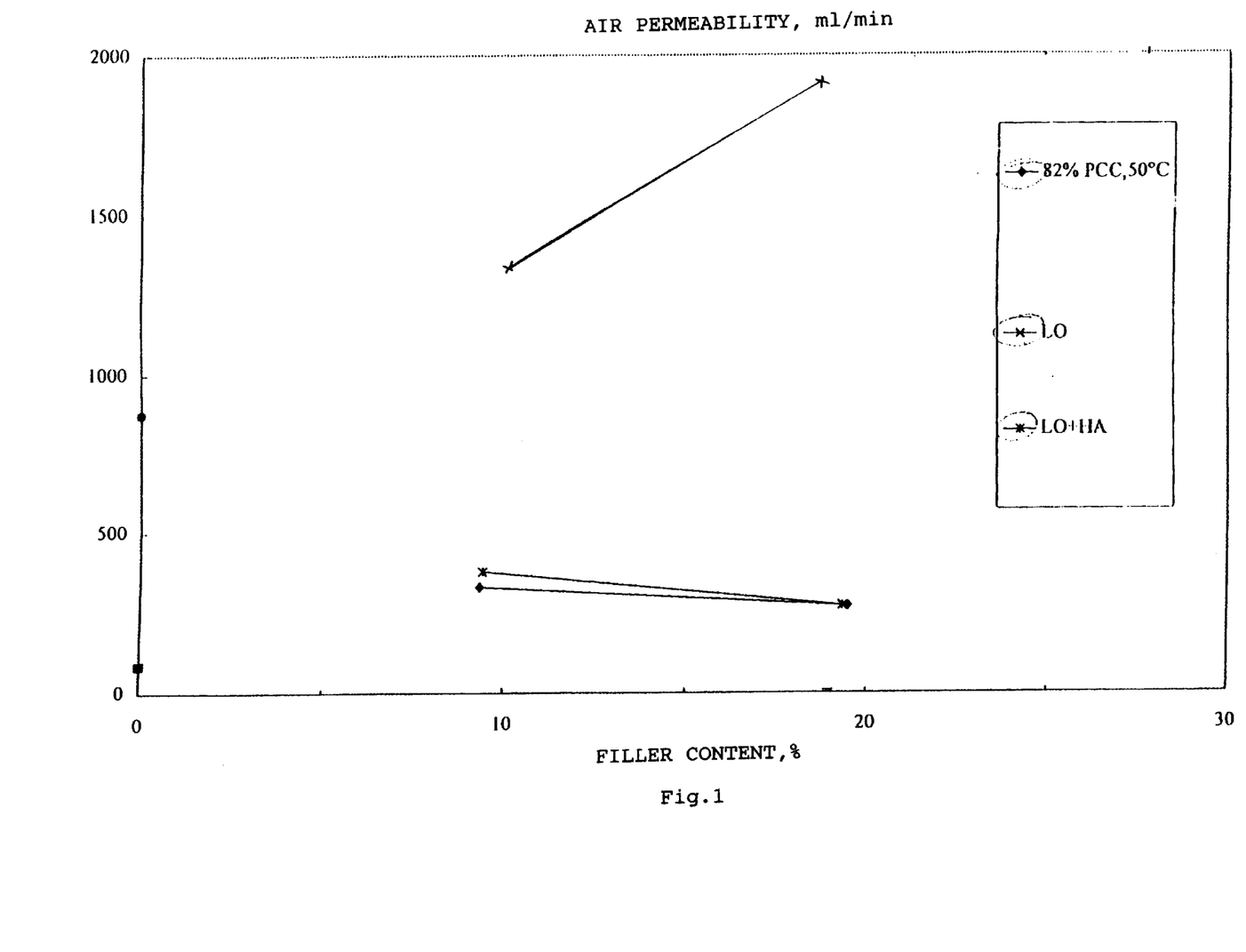
FIG. 1 represents the air permeability of paper produced using a filler according to the invention, as a function of filler content, measured from different paper samples.
Figure 2:
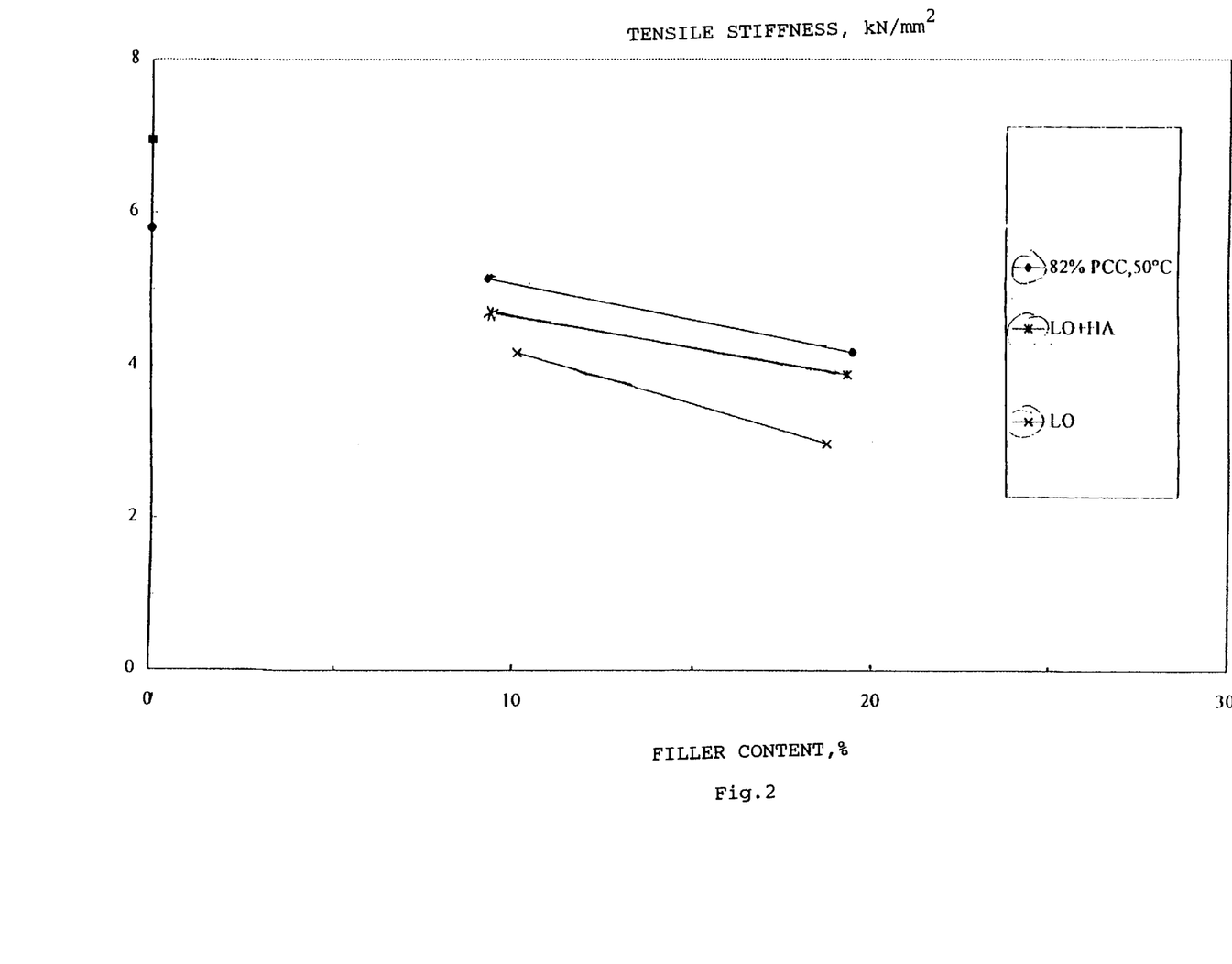
FIGS. 2, 3, 4 and 5 represent the tensile stiffness, interlaminar strength, light-scattering coefficient and corresponding ISO brightness of the paper sorts presented in FIG. 1, all as functions of filler content.
Figure 3:
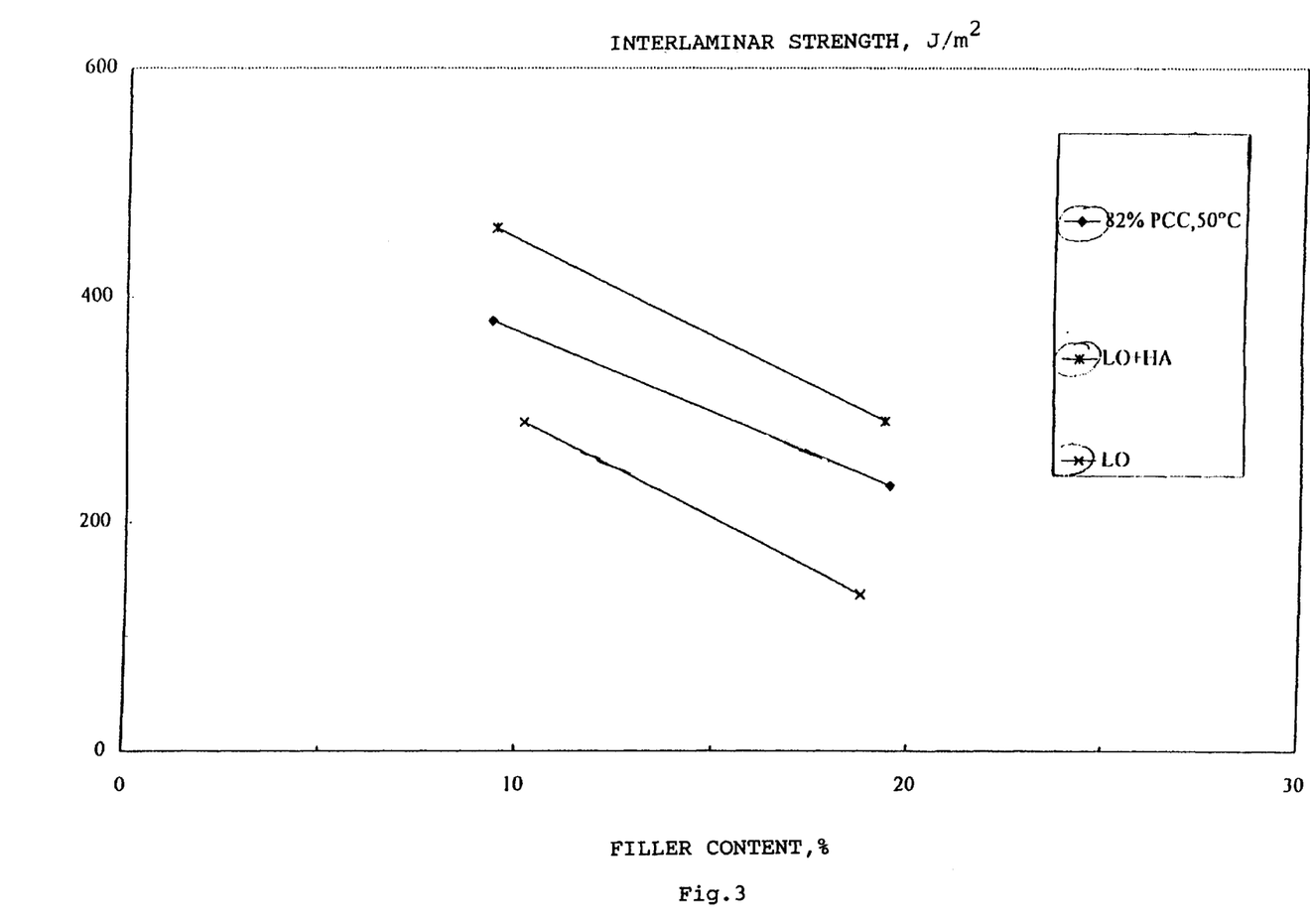
Figure 4:
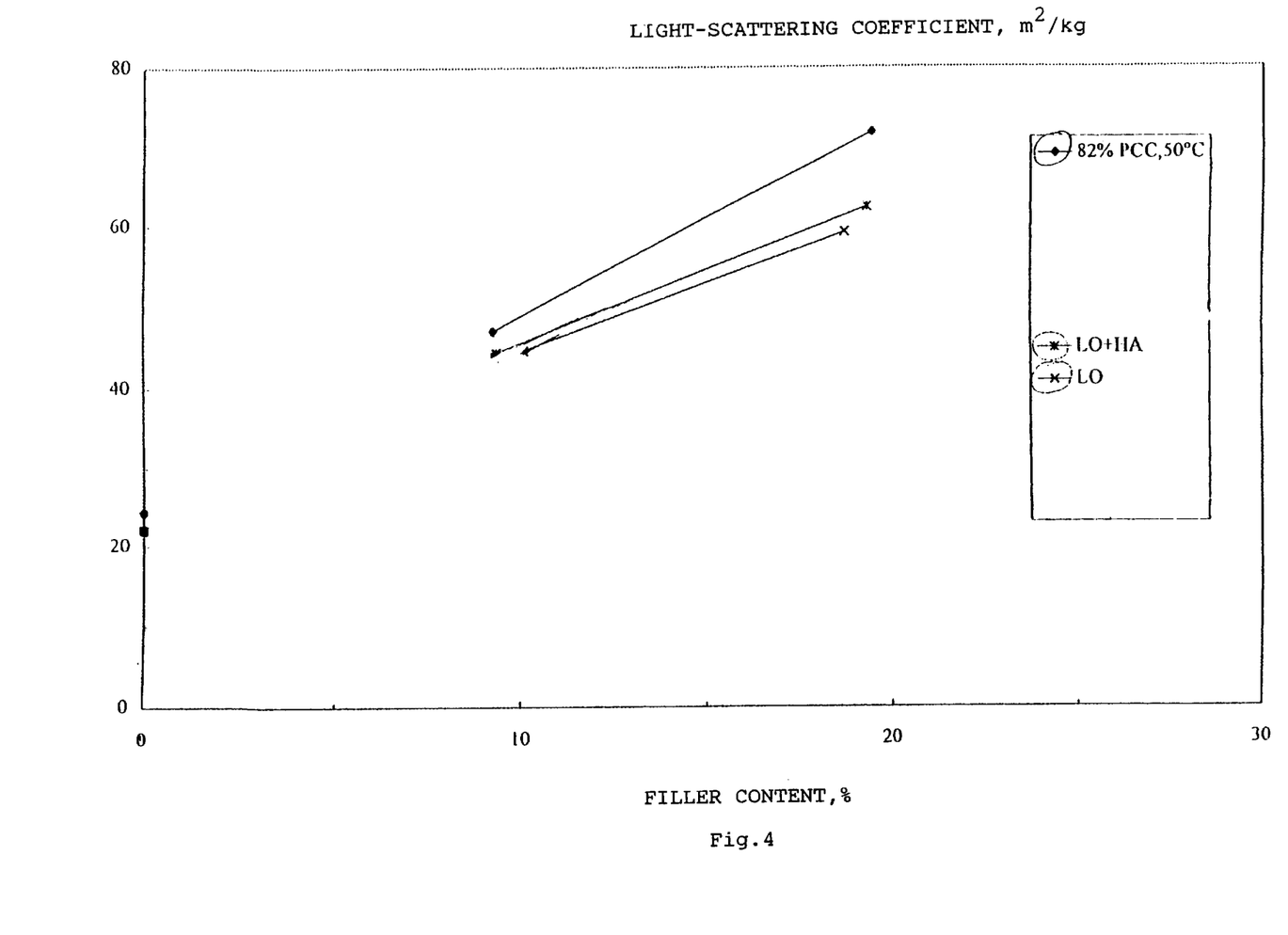
Figure 5:
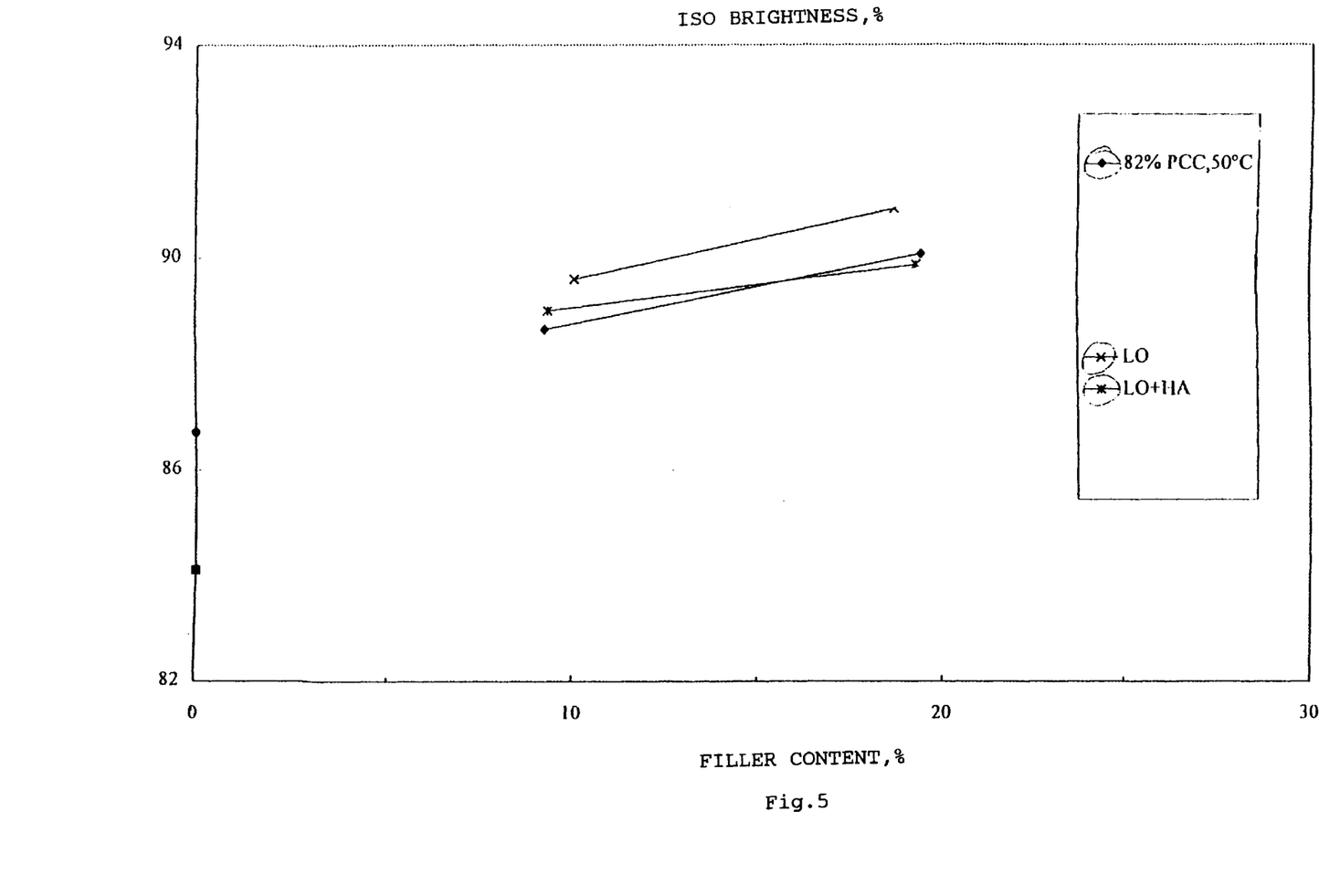
Figure 6:
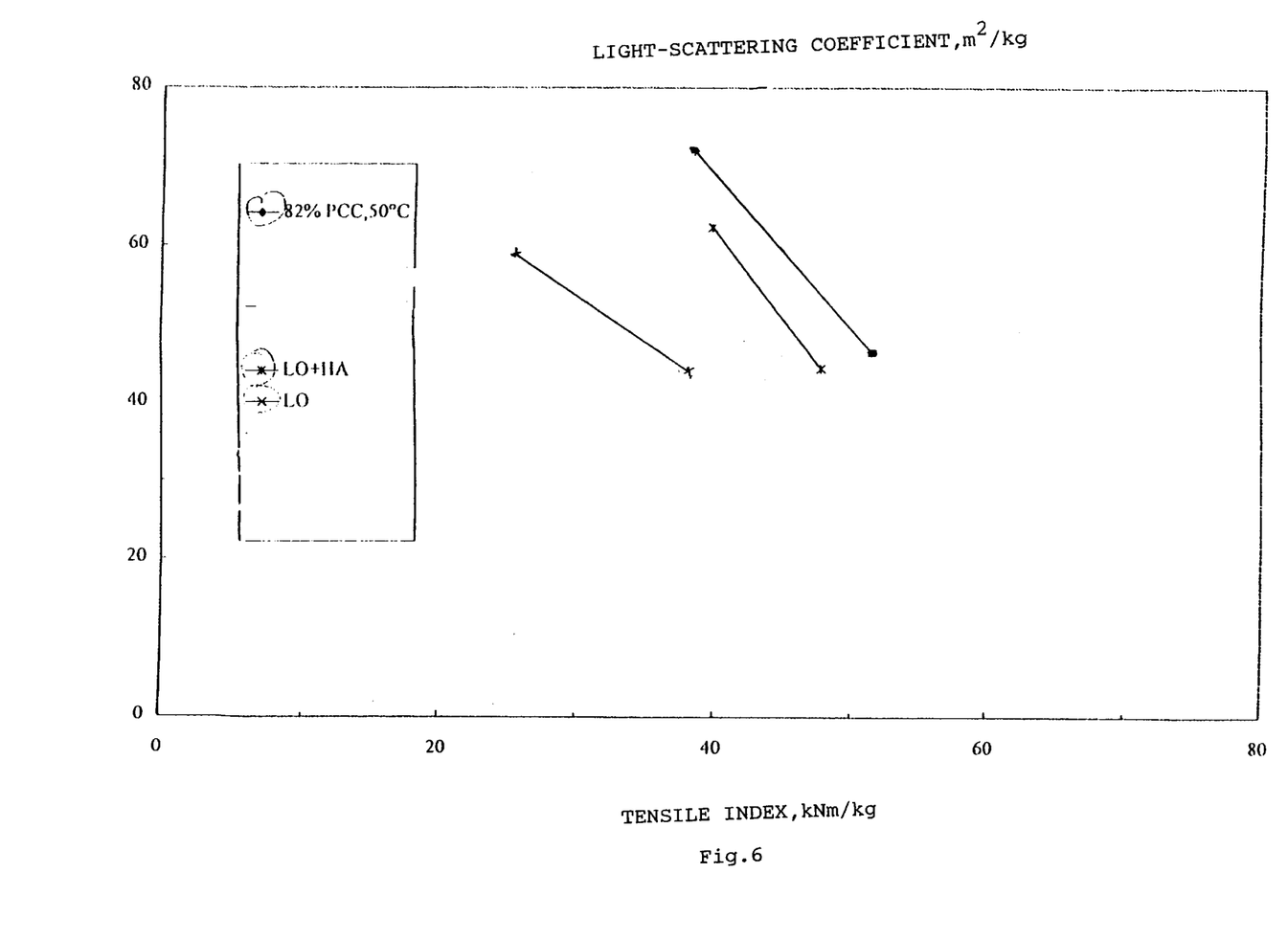
FIG. 6 represents the light-scattering coefficients of the same paper sorts as functions of the tensile index.
Figure 7:
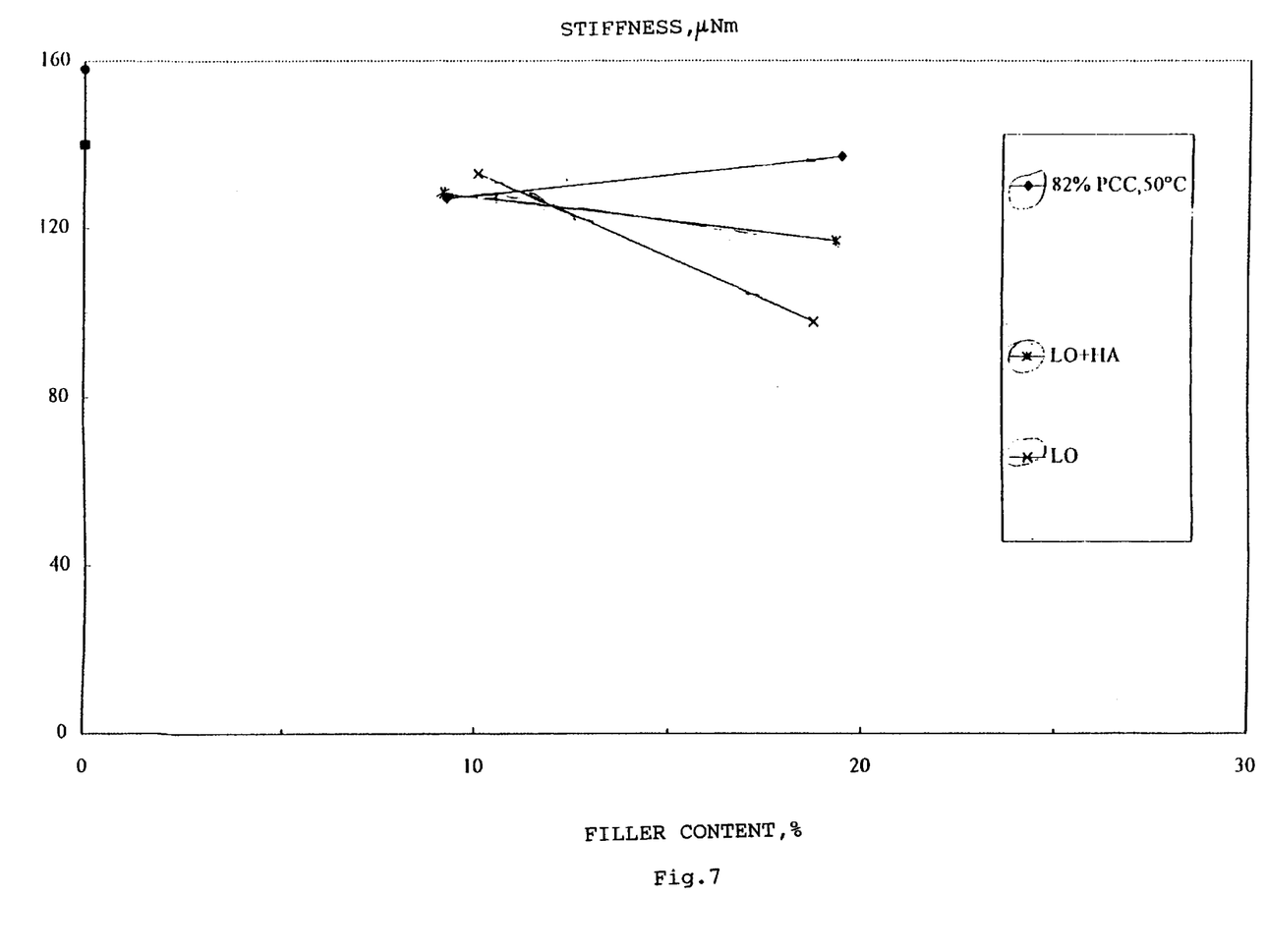
FIGS. 7, 8 and 9 represent the stiffness, tensile index and corresponding formation as functions of filler content.
Figure 8:
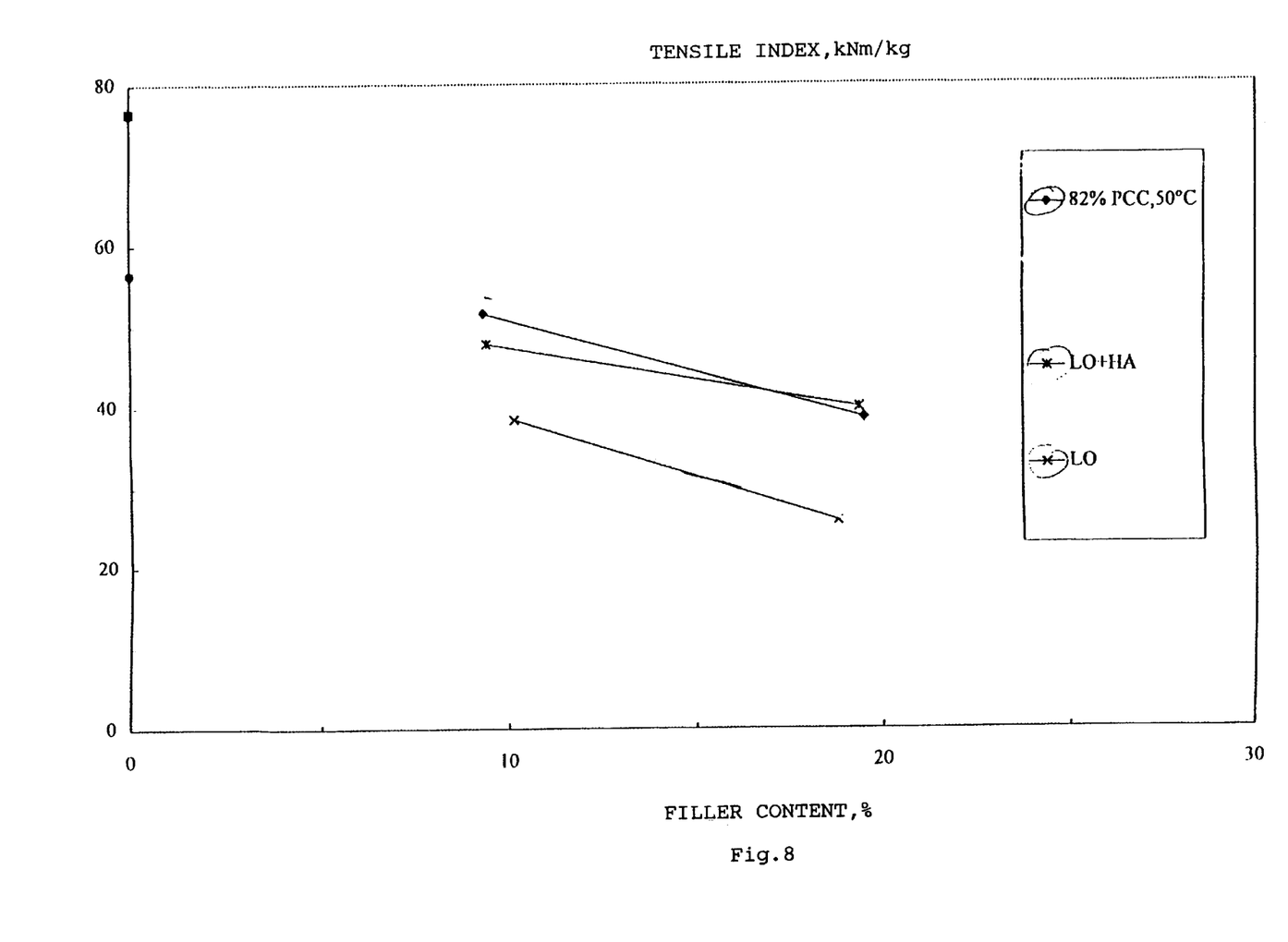
Figure 9:
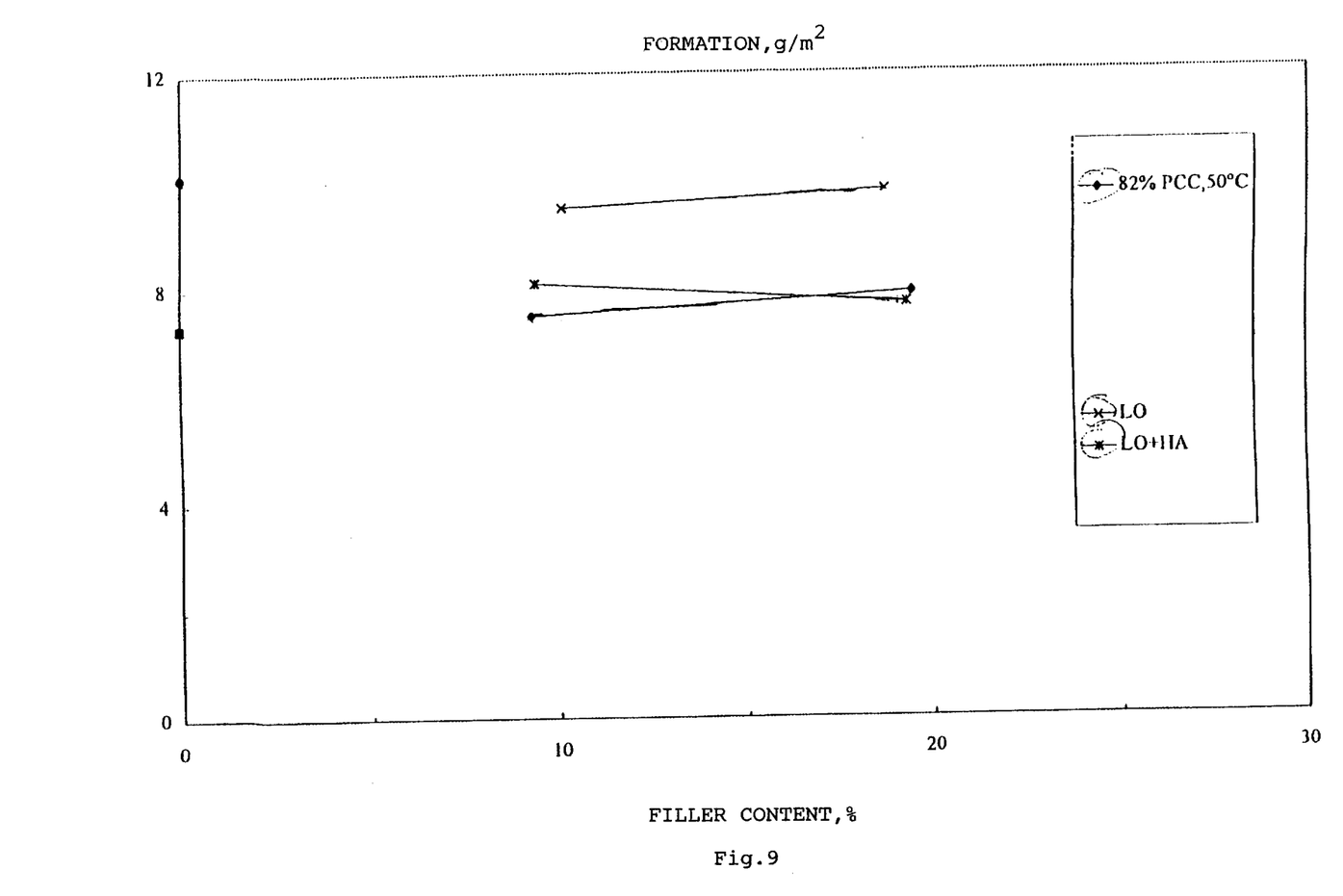

The filler was prepared in a mixing tank by mixing the pigment and noil for 20 minutes at a mixing rate of 500–600 l/s. The pigment used was a commercial calcium carbonate product (PCC) with the trade name Albacar LO; the mixing ratio of calcium carbonate/noil was about 82%. The filler thus obtained was used in the production of test sheets (FIGS. 1–12).

EXAMPLE 2

Paper Properties

To test the technical potential of the filler in paper manufacture, a series of sheet tests was carried out, in which the paper properties obtained by using the filler of the invention and calcium carbonate fillers already on the market were compared.

For the production of laboratory sheets, a pulp mixture containing 75 w-% bleached chemical birch sulphate pulp and 25% bleached chemical pine sulphate pulp was prepared. The birch and pine pulps were refined in a Valley laboratory hollander to Schopper-Riegler number 22 and 27, respectively, in accordance with the SCAN-C 25:76 standard.

The filler prepared in Example 1 was used undiluted in the production of the laboratory sheets. For the production of reference sheets, solutions having a concentration of 25 g/l were prepared from commercial $CaCO_3$ fillers.

In a laboratory sheet mould, sheets of 60 g/m$^2$ were produced without circulation water in accordance with the SCAN-C 26:76 and SCAN-M 5:76 standards except for drum drying and corresponding wet pressing. As retention agents, cationic starch (Raisamyl 135) in an amount of 0.65% and silica in an amount of 0.15% of the fibre mass were used.

In the wet pressing process corresponding to drum drying, the sheets were piled as follows:

| | |
|---|---|
| Top of pile → | press plate |
| | 2 dried blotting boards |
| | new blotting board |
| | laboratory sheet |
| | couch board |
| | 2 dried blotting boards |
| Bottom of pile → | press plate |

The sheet pile was placed in a press and it was pressed so that the sheets were subjected to a pressure of 490±20 kPa for 4 minutes. After the wet pressing, the blotting boards on either side of the sheets were left sticking to the sheets and the sheets were placed in a cold drying drum. The sheets were dried in the drum at a temperature of 100° C. for 2 h. After the drying, the blotting boards were released from the sheets and the sheets were seasoned for at least 24 h at a temperature of 23±1° C. and a relative humidity of 50±2%.

For the finished sheets, the calcium carbonate content, grammage, ISO brightness, light-scattering coefficient and tensile index were determined. The results are presented in a graphic form in FIGS. 1–12.

EXAMPLE 3

Refining Test

To test different methods for producing the filler, chemical softwood pulp and chemical birch pulp were refined using a Voith Sulzer laboratory refiner (corresponding to an industrial refiner). The refining conditions were as follows:

| | chemical softwood pulp | chemical birch pulp |
|---|---|---|
| consistency | 4% | 5% |
| edge load | 1.5 Ws/m | 1.0 Ws/m |
| refiner cones | | |
| beating angle | 60° | 60° |
| refining | without pH adjustment | without pH adjustment |
| specific energy consumption | 400–500 kWh/t | 300–400 kWh/t |

When a beating angle of 60° is used in the conical refiner, the refining process is not hard and it is suitable in respect of strength.

The products obtained were fractionated using Bauer-McNett screening. The fractions thus obtained are presented in Table 1.

TABLE 1

| Fraction mesh | Chemical softwood pulp/% | Chemical birch pulp/% |
|---|---|---|
| +14 | 3.8 | |
| 14–28 | 37.5 | 2.2 |
| 28–48 | 16.1 | 41.0 |
| 48–100 | | 30.3 |
| 48–200 | 15.6 | |
| 100–200 | | 8.8 |
| −200 | 27.0 | 17.7 |

The SR number was 94 for softwood pulp and 92 for birch pulp, and the consistency for softwood pulp was 4% and 3.5% for birch pulp.

EXAMPLE 4

Production of Filler

The manufacturing procedure described in Example 1 is repeated using commercial pigments: kaolin, talcum, titanium dioxide, ground calcium carbonate, ground chalk, synthetic silicate, sulphate and aluminium hydroxide. An appropriate retention system is used in the procedure. The fillers obtained are used to test paper properties according to Example 2. The results correspond to those obtained in Example 2.

The above embodiment examples are intended to illustrate the invention without limiting it in any way.

What is claimed is:

1. Filler for use in paper manufacture, said filler comprising:
    noil produced from one of cellulose fibre and mechanical pulp fibre by refining, and
    pigment mixed with the noil, the noil including noil fibrils corresponding in size distribution to wire screen fraction P50 or finer.

2. Filler as defined in claim 1, characterised in that the filler has been fractionated.

3. Filler as defined in claim 1, characterised in that, in respect of size distribution, the noil fibrils mainly correspond to wire screen fraction P100.

4. Filler as defined in claim 1, characterised in that the mass ratio of pigment to noil is in the range 0.1–20.

5. Filler as defined in claim 4, wherein the mass ratio is in the range 2–6.

6. Filler as defined in claim 1, characterised in that the pigment includes at least one of kaolin, talcum, titanium dioxide, ground calcium carbonate, precipitated calcium carbonate (PCC), chalk, synthetic silicate, barium sulphate and aluminium hydroxide.

7. Filler as defined in claim 6, characterised in that the pigment consists of ground and/or precipitated calcium carbonate.

8. Filler as defined in claim 1, characterised in that the concentration of the filler is in the range 0.04–30% by weight.

9. Filler as defined in claim 5, wherein the concentration of the filler is in the range 0.5–5% by weight.

10. Method for producing a filler for use in paper manufacture, comprising:
    producing said noil from one of cellulose fibre and mechanical pulp fibre by refining, and
    mixing pigment with the noil,
    wherein the noil includes of noil fibrils have a size distribution corresponding substantially to wire screen fraction P50 or finer.

11. Method as defined in claim 10, characterised in that, in respect of size distribution, the noil fibrils contained in the noil mainly correspond to wire screen fraction P100.

12. Method as defined in claim 10, characterised in that the noil is fractionated.

13. Method as defined in claim 10, characterised in that the noil is produced from cellulose fibre and/or mechanical pulp fibre by refining using a refiner so that the edge load is of the order of 0.01–8 Ws/m.

14. Method as defined in claim 10, characterised in that the specific energy consumption in the refining process is in the range of approximately 10–1000 kWh/t.

15. Method as defined in claim 14, wherein the specific energy consumption of the refining process is in the range 100–300 kWh/t.

16. Method as defined in claim 10, characterised in that the pigment and noil are so mixed having a mass ratio in the range 0.1–20.

17. Method as defined in claim 16, wherein the pigment and noil are mixed having a mass ratio in the range 2–6.

18. Method as defined in claim 10, characterised in that the pigment includes at least one of kaolin, talcum, titanium dioxide, ground calcium carbonate, precipitated calcium carbonate (PCC), chalk, synthetic silicate, barium sulphate and aluminium hydroxide.

19. Method as defined in claim 18, characterised in that the pigment consists of ground and/or precipitated calcium carbonate.

* * * * *